United States Patent
Al Faruque et al.

(10) Patent No.: US 9,232,020 B2
(45) Date of Patent: Jan. 5, 2016

(54) DEPLOYING SERVICES DURING FULFILLMENT OF A SERVICE REQUEST

(71) Applicants: Mohammad Abdullah Al Faruque, Irvine, CA (US); Livio Dalloro, Princeton, NJ (US); Hartmut Ludwig, West Windsor, NJ (US); Siyuan Zhou, Dayton, NJ (US)

(72) Inventors: Mohammad Abdullah Al Faruque, Irvine, CA (US); Livio Dalloro, Princeton, NJ (US); Hartmut Ludwig, West Windsor, NJ (US); Siyuan Zhou, Dayton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 358 days.

(21) Appl. No.: 13/711,691

(22) Filed: Dec. 12, 2012

(65) Prior Publication Data

US 2013/0159461 A1 Jun. 20, 2013

Related U.S. Application Data

(60) Provisional application No. 61/570,443, filed on Dec. 14, 2011.

(51) Int. Cl.
*G06F 15/16* (2006.01)
*H04L 29/08* (2006.01)

(52) U.S. Cl.
CPC ............... *H04L 67/32* (2013.01); *H04L 67/16* (2013.01)

(58) Field of Classification Search
CPC ................................ H04L 67/16; H04L 67/32
USPC .................................................. 709/217–219
See application file for complete search history.

(56) References Cited

U.S. PATENT DOCUMENTS

| 2003/0140131 | A1* | 7/2003 | Chandrashekhar et al. .. 709/223 |
| 2007/0073858 | A1 | 3/2007 | Narayanan et al. |
| 2011/0126207 | A1* | 5/2011 | Wipfel et al. ................. 718/104 |
| 2012/0174095 | A1 | 7/2012 | Natchadalingam et al. |
| 2013/0185586 | A1* | 7/2013 | Vachharajani et al. ........... 714/2 |

FOREIGN PATENT DOCUMENTS

WO 2010/115060 10/2010

OTHER PUBLICATIONS

Peter Laird, "How Oracle, IBM, SAP, Microsoft, and Intuit are responding to the SaaS Revolution.". Laird OnDemand. Blogspot, Jun. 5, 2008.
Yi Wei and M. Brian Blake, "Service-Oriented Computing and Cloud Computing: Challenges and Opportunities", IEEE Internet Computing, pp. 72-75, vol. 14,2010.
M.B. Blake, "Decomposing Composition: Service-Oriented Software Engineers,"•IEEE Software, vol. 24, No. 6, 2007, pp. 68-77.

(Continued)

*Primary Examiner* — Mohamed Wasel

(57) ABSTRACT

Deployment of a plurality of services to a plurality of nodes in a communication network during fulfillment of a service request may be facilitated. A request for the services may be received from the service consumer via a first node of the plurality of nodes. The first node is associated with the service consumer. One or more second nodes of the plurality of nodes are identified in the communication network. Each of the one or more second nodes is associated with one or more service providers. It is determined whether the first node and the one or more second nodes are capable of providing the requested services. The provision of the requested services is assigned to the first node, one or more of the second nodes, or a combination thereof, based on the determination.

18 Claims, 4 Drawing Sheets

(56) References Cited

OTHER PUBLICATIONS

M.P. Papazoglou et al., "Service-Oriented Computing: A Research Roadmap,"•Int'l J. Cooperative Information Systems, vol. 17, No. 2, 2008, pp. 223-255.

Raines, "Cloud Computing and SOA," MITRE, white paper, Oct. 2009; www.mitre.org/workltech-papersitech-papers_09/09_074309_07 43.pdf.

M. Armburst et al., "Above the Clouds: A Berkeley View of Cloud Computing,"•tech. report UCB/EECS-2009-28, Electrical Eng. and Computer Science Dept., Univ. of California, Berkeley, 2009.

Mamdouh Ibrahim, Gil Long, "Service-Oriented Architecture and Enterprise Architecture, Part 1: A framework for understanding how SOA and Enterprise Architecture work together," IBM research, 2007.

Savas Parastatidis and Jim Webberm "Service-Oriented, Distributed, High-Performance Computing," Microsoft research, 2005, http://msdn.microsoft.com/en-usllibrary/aa480054.aspx.

M.P. Papazoglou and D. Georgakopoulos, "Service-Oriented Computing",2003, http://www.gsic.uva.eslwikis/juaase/imagesia/ac/WebServices-Papazoglou-CACM-2003.pdf.

M. N. Huhns and M. P. Singh "Service-oriented computing: key concepts and principles," IEEE Internet Computing, 2005, http://ieeexplore.ieee.org/xpislabs_all .jsp?arnumber= 1407782&tag= 1.

Kishore Channabasavaiah and Kerrie Holley, Migrating to a service-oriented architecture, IBM, http://academic.regis.edu/dmmilier/courses/mscc630/G224-7298-oo_Final.pdf.

F. Jammes and H. Smit, Service-oriented paradigms in industrial automation, IEEE transaction on Industrial Informatics, 2005, http://ieeexplore.ieee.org/xpls/abs_all.jsp?amumber=1411764.

David Hadas, "Network Abstraction The Network Hypervisor," IBM, 2010.

Karthik Lakshmanan and Raj Rajkumar, "Distributed Resource Kernels: OS Support for End-To-End Resource Isolation," IEEE Real-Time and Embedded Technology and Applications Symposium, 2008.

* cited by examiner

DEPLOYING SERVICES DURING FULFILLMENT OF A SERVICE REQUEST

RELATED APPLICATIONS

The present patent application claims the benefit of the filing date under 35 U.S.C. §119(e) of U.S. Provisional Patent Application Ser. No. 61/570,443, filed Dec. 14, 2011, which is hereby incorporated by reference herein in its entirety.

BACKGROUND

The present embodiments relate to the deployment of services during fulfillment of a service request for a service consumer.

Innovative technologies in the areas of computer architecture, chip fabrication, networking, programming models, operating systems, application performance, and algorithms, among others, have transformed the computing paradigm many times. The computing industry has generally moved from main-frame computing platforms to personal microcomputer and embedded computing platforms. Recently, handheld computing devices having the similar computing power as personal microcomputers have furthermore transformed the computing paradigm. Today, a heterogeneous world of computing platforms generally exists, mainly in computer architecture and the operating systems used by these computing platforms. However, communication technology, especially the Internet (in macro scale among devices or individual systems), has revolutionized the interaction among these various heterogeneous computing platforms.

Typically, to perform some computing functionalities, a user buys a computing device and its associated software as an integrated product. If the user requires some new functionality to be performed, then he/she needs to buy additional software. However, the paradigm has been shifted towards service-oriented architecture, e.g. cloud computing, where computing is delivered as a service rather than as an integrated hardware and software product. The Internet has allowed highly distributed applications to be implemented in the form of service-oriented architecture. A service consumer may instantiate an application on-demand by requesting various available, distributed services that interact with one another to form the application.

A service provider may fulfill the service requests from the service consumer (and other service consumers). The service provider utilizes "downstream" computing platforms (e.g., computing devices within data centers) to host and provide the services. More specifically, the service provider utilizes the "downstream" computing platforms to compute the required service-related information on-demand. The service provider does not utilize any other computing platforms, other than the "downstream" computing platforms noted above, to host and/or provide the required services.

The service provider may, in some cases, have to fulfill service requests from a number of service consumers at different times. In some cases, a multiplicity of service components (e.g., computing devices within downstream data centers) are used on the service provider side to fulfill the service requests. Problematically, requests from many consumers may stretch the resources, particularly the computational capacity, of the service components. Accordingly, the service provider may be unable to promptly and efficiently provide the requested services to the service consumer on demand, as requested.

BRIEF SUMMARY

In order to more quickly and efficiently provide on demand services to a service consumer, deployment of one or more services to a plurality of nodes in a communication network may be facilitated during fulfillment of a service request for the service consumer. The one or more services may be deployed to computing devices associated with a service provider, computing devices associated with the service consumer, and/or network devices in the communication network.

In a first aspect, a method of facilitating deployment of one or more services to a plurality of nodes in a communication network during fulfillment of a service request is provided. A request for the one or more services is received from the service consumer via a first node of the plurality of nodes, the first node being associated with the service consumer. One or more second nodes of the plurality of nodes are identified in the communication network, each of the one or more second nodes being associated with one or more service providers. It is determined whether the first node and the one or more second nodes are capable of providing the requested services. The one or more requested services are assigned to the first node, one or more of the second nodes, or a combination thereof, based on the determination.

In a second aspect, a system for facilitating deployment of services during fulfillment of a service request for a service consumer is provided. The system includes a first computer and a second computer in communication with each other via a communication network. The first computer is associated with the service consumer and the second computer is associated with a service provider. The system further includes a memory that stores instructions executable by the first computer. The instructions are for: receiving a request from the service consumer for the services; determining, based on the service request, whether the second computer is available to provide the services, and, when the second computer is available to provide one or more of the services, deploying the one or more services to the second computer; determining, when the second computer is not available to provide one or more of the services, whether the first computer is available to provide the one or more services, and when the first computer is available to provide the one or more services, deploying the one or more services to the first computer.

In a third aspect, a non-transitory computer-readable storage medium having stored therein data representing instructions executable by a programmed processor for facilitating deployment of one or more services to a plurality of devices in a communication network during fulfillment of a service request for a service consumer. The instructions include instructions for receiving a request for the one or more services from a client device associated with the service consumer. The instructions include instructions for identifying one or more provider computing devices and one or more networking devices in the communication network, each of the one or more provider computing devices being associated with a service provider. The instructions include instructions for determining whether the client device, the one or more provider computing devices, and the one or more networking devices are capable of providing the one or more requested services. The instructions include instructions for deploying, based on the determining, the one or more services to the client device, one or more of the provider computing devices, one or more of the networking devices, or combinations thereof, via the communication network. The instructions further include instructions for receiving the one or more services from the client device, one or more of the provider computing devices, one or more of the networking devices, or combinations thereof, via the communication network.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the FIGS. are not necessarily to scale, emphasis instead being placed upon illustrating the principles of the invention. Moreover, in the FIGS., like reference numerals designate corresponding parts throughout the different views.

DETAILED DESCRIPTION OF THE DRAWINGS AND PRESENTLY PREFERRED EMBODIMENTS

The present embodiments generally relate to deploying one or more services to a plurality of nodes in a communication network during fulfillment of a service request for a service consumer. Unlike known platforms, which only utilize "downstream" service provider computing platforms (e.g., computing devices within data centers "downstream" from the service provider) to provide services, the disclosed embodiments utilize or leverage both "downstream" computing platforms and "upstream" computing platforms (e.g., computing platforms associated with a service consumer, networking devices in the communication network). In other words, the disclosed embodiments utilize or leverage the computational capacity of computing platforms (e.g., client devices) associated with the service consumer and networking devices in the intervening communication network when fulfilling service requests from the service consumer. Accordingly, the disclosed embodiments may provide greater load balancing (e.g., the service providers will not be overloaded with computation requests), higher performance (e.g., higher performance services), higher scalability (any existing hardware may host the execution of services on demand), and higher service availability.

Figure 1:
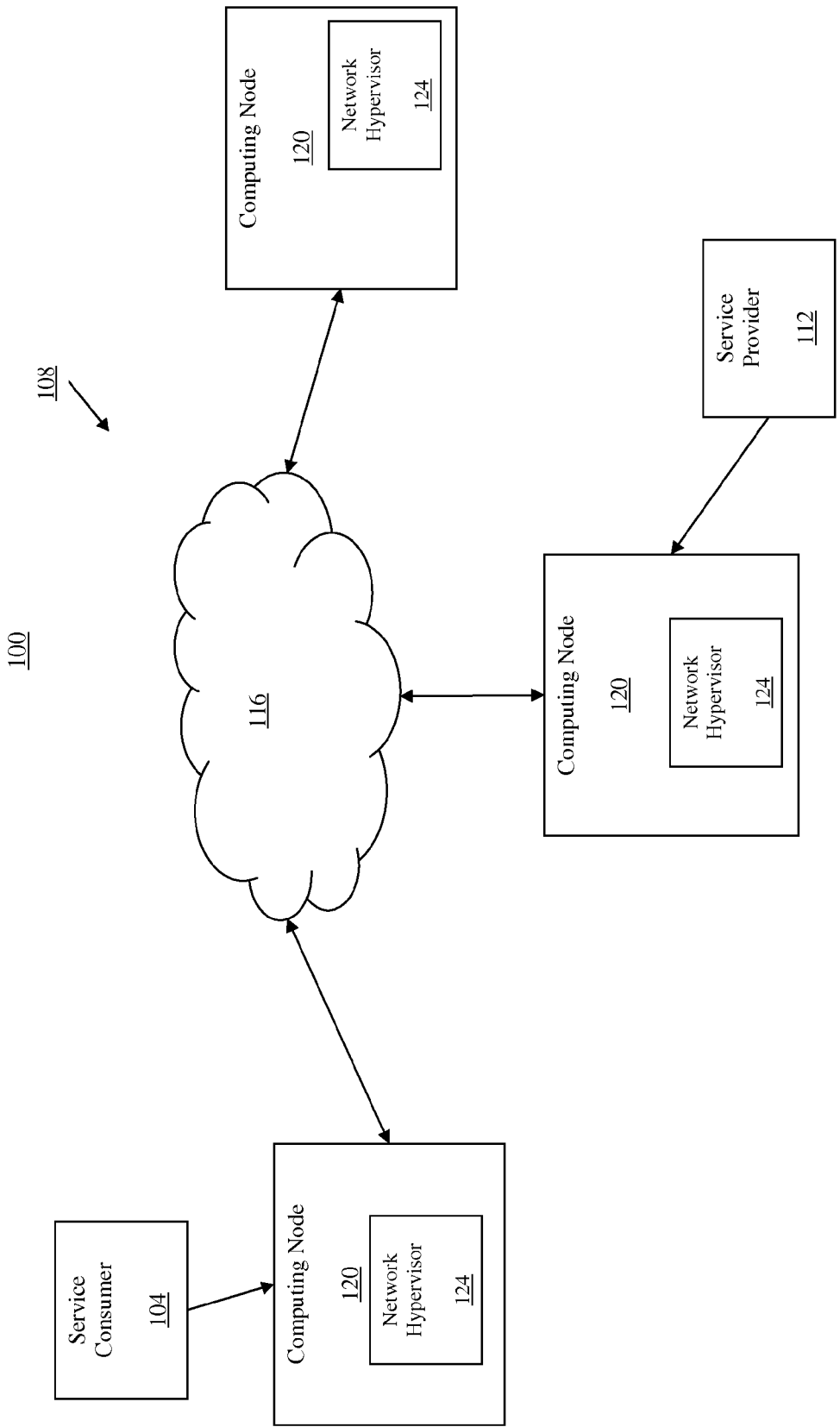
FIG. 1 is a block diagram of a system for facilitating deployment of services in a communication network during fulfillment of a service request.

FIG. 1 depicts a system 100 for facilitating the deployment of services during fulfillment of a service request for a service consumer 104. The system 100 generally includes a virtual computing platform 108 operated by, or otherwise associated with, a service provider 112. The virtual computing platform 108 includes, utilizes, or is connected by or via a communication network 116. The virtual computing platform 108 includes a plurality of computing nodes, computing devices, or computers 120 coupled to or in communication with one another via the communication network 116 or another network. As such, the computing nodes 120 are in communication with each other via the communication network 116. As used herein, the phrases "in communication" and "couple" include a direct connection or an indirect connection through one or more intermediate components. Such intermediate components may include hardware and/or software-based components. The system 100 further includes a plurality of distributed software layers 124 associated with the plurality of computing nodes 120.

In other embodiments, the system 100 may include additional, different, or fewer components. For example, the system 100 may include additional service consumers 104, virtual computing platforms 108, service providers 112, and/or communication networks 116. As another example, the plurality of computing nodes 120 may be coupled or connected to one another using one or more different networks.

The virtual computing platform 108 generally hosts one or more services and associated context (e.g., data, instruction, heap and stack entries, register entries, etc.) As used herein, the term service refers to computing or computational logic. Each service uses defined protocols that describe how services pass and parse messages using description metadata. Each service implements one action, task, or function, such as, for example, filling out an online application for an account, viewing an online bank statement, or placing an online booking or airline ticket order. The services are executable when hosted in a computing node (e.g., one of the nodes 120). During fulfillment of a service request for a service consumer (e.g., the service consumer 104), the virtual computing platform 108 may deploy one or more services (and any associated context) to any one of the computing nodes 120, as will be described in greater detail below.

The communication network 116 may be a wireless network, a wired network, combinations of a wired and a wireless network, such as an 802.11x compliant network, combinations of wired and/or wireless networks, and may include publicly accessible networks, such as the Internet, a local area network, a wide area network, private networks, or combinations thereof. In one embodiment, the network 116 includes a plurality of different networks. The type and configuration of the communication network 116 is implementation dependent, and any type of communication network which facilitates the described communications between the nodes 120, available now or later developed, may be used.

Figure 2:
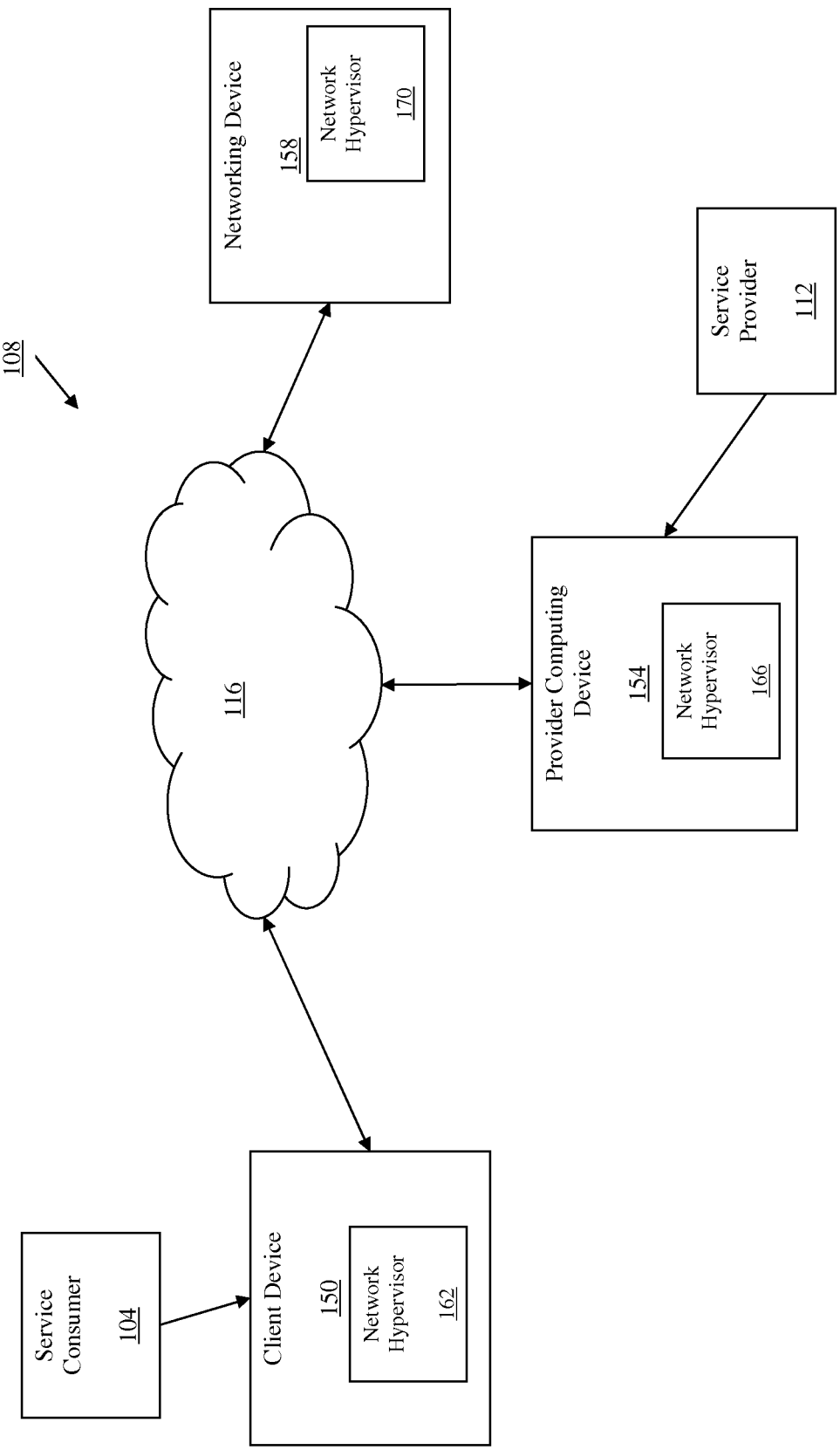
FIG. 2 is a block diagram of an exemplary virtual platform of the system of FIG. 1.

As noted above, the virtual platform 108 generally includes the plurality of computing nodes 120. The computing nodes 120 may include or be one or more client or consumer computing devices 150, one or more provider computing devices 154, one or more networking devices 158, or combinations thereof, in or connected to the communication network 116. FIG. 2 illustrates an exemplary virtual platform 108 in which the plurality of computing nodes 120 includes one client or consumer computing device 150, one provider computing device 154, and one networking device 158 in or connected to the communication network 116. As such, the computing device 150, the provider computing device 154, and the networking device 158 are in communication with one another via the communication network 116. In other embodiments, however, the virtual platform 108, and, more specifically, the plurality of computing nodes 120 may include one, two, three, or any other number of devices 150, 154, and/or 158. For example, the plurality of computing nodes 120 may include one device 150, two devices 154, and one device 158.

The client device 150 may be a computer (e.g., tablet, desktop, or notebook), a workstation, a display system, a mobile device (e.g., a mobile phone), or other client device associated with a service consumer or customer (e.g., the service consumer 104). The one or more client devices 150 are, at least as described herein, "upstream" computing nodes because they are located "upstream" from the service provider 112. In some embodiments, each client device 150 is associated with a different service consumer 104. In other embodiments, one or more service consumers 104 may each be associated with two or more client devices 150.

The computing device 154 may be a peer, server (e.g., application server), computer, workstation, mobile device, or other computing device associated with a service provider (e.g., the service provider 112). One or more of the computing devices 154 may be, at least as described herein, "downstream" computing nodes (i.e., located "downstream" from the service provider 112). When the computing nodes 120 include more than one computing device 154, the computing devices 154 may be located in the same location (e.g., in one data center) or in different locations (e.g., distributed geographically across any area, such as distributed across two or more data centers).

The networking device 158 may be a router, switch, hub, or other networking device. The networking device 158 may be an intermediary between the service provider 112 and the service consumer 104. Like the one or more client devices, the one or more networking devices 158 are, at least as described herein, "upstream" computing nodes (because they are located "upstream" from the service provider 112). The networking device 158 may be part of the network 116. The service provider 112 may not own or control the networking device 158. The networking device 158 is used to communicate information between the service provider 112 and the service consumer 104 or between other parties using the network formed, at least in part, by the networking device 158. Alternatively, the networking device 158 is owned or controlled by the service provider 112.

In the disclosed embodiments, each computing node 120, particularly each client device 150, computing device 154, and networking device 158, includes a processor, a memory, and an operating system installed thereon. The processor may be a general processor, a digital signal processor, ASIC, field programmable gate array, graphics processing unit, analog circuit, digital circuit, combinations thereof, or other now known or later developed processor. The memory may be a volatile memory or a non-volatile memory. The memory may include one or more of a read only memory (ROM), random access memory (RAM), a flash memory, an electronic erasable program read only memory (EEPROM), or other type of memory. The memory may include an optical, magnetic (hard drive) or any other form of data storage device. The operating system may be Linux, Microsoft Windows, Android, MAC OS X, or any other operating system.

One or more nodes (e.g., the client device 150, the computing device 154) may include a display. The display may be a liquid crystal display (LCD) panel, light-emitting diode (LED) screen, thin film transistor screen, or any other type of display. In other embodiments, however, one or more of the computing nodes 120 may include additional, fewer, or different components. For example, one or more of the computing nodes 120 may not include a display and/or an operating system.

With reference again to FIG. 1, the virtual platform 108 generally includes the plurality of distributed software layers or network hypervisors 124 associated with the plurality of computing nodes 120. Some or all of the computing nodes 120 may be associated with one of the distributed software layers 124. In to the exemplary virtual platform 108 shown in FIG. 2, the plurality of distributed software layers 124 includes a distributed software layer or network hypervisor 162, a distributed software layer or network hypervisor 166, and a distributed software layer or network hypervisor 170. The distributed software layer 162 is associated with the client device 150, the distributed software layer 166 is associated with the provider computing device 154, and the distributed software layer 170 is associated with the networking device 158. In other embodiments, the plurality of distributed software layers 124 may include additional, different, or fewer distributed software layers, the distributed software layers 162, 166, and/or 170 may be associated with additional or different computing nodes 120, only some of the computing nodes 120 are associated with one of the distributed software layers 124, or combinations thereof. For example, only the one or more client devices 150 and the one or more provider devices 154, but not the networking devices 158, may be associated with one of the distributed software layers 124.

The distributed software layers 124 are architecture agnostic (i.e., executable in any heterogeneous platform) and may be built into, implemented within, or otherwise provided in the computing nodes 120. In the disclosed embodiments, the distributed software layers 124 are built into the computing nodes 120 above or on top of the operating system of the nodes. The software layers 124 are applications, software, or firmware running as an instance pursuant to the corresponding operating system. As shown in FIG. 2, the distributed software layer 162 is built on top of the operating system of the client device 150, the distributed software layer 166 is built on top of the operating system of the provider computing device 154, and the distributed software layer 170 is built on top of the operating system of the networking device 158. In other embodiments, one or more of the distributed software layers 124 may be built into or implemented within a different portion (e.g., at a different location relative to the operating system) of the respective computing node 120 or the operating system. As will be described in greater detail below, the distributed software layers 124 are generally configured to facilitate the deployment of the services during fulfillment of a service request for the service consumer 104 to or among one or more of any of the plurality of the computing nodes 120.

Figure 3:
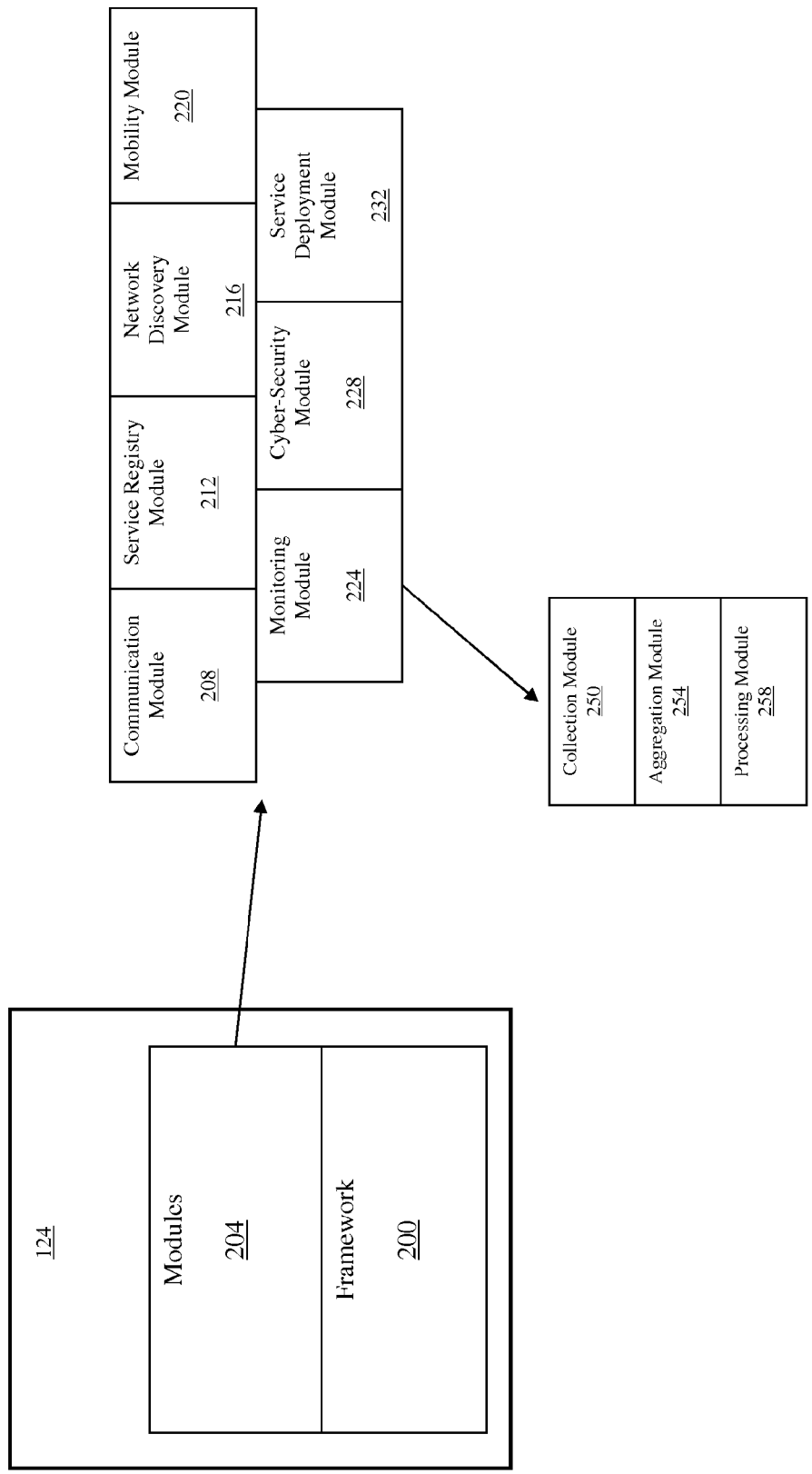
FIG. 3 is a block diagram of one embodiment of a network hypervisor of the system of FIG. 1.

With reference to FIG. 3, each software layer or network hypervisor 124, including the distributed software layers 162, 166, 170, generally includes a hypervisor framework 200 and a plurality of hypervisor or system modules 204 provided on or in the framework 200. In the disclosed embodiments, the hypervisor modules 204 each include a communication module 208, a service registry module 212, a network discovery module 216, a code mobility module 220, a monitoring module 224, a cyber-security module 228, and a service deployment module 232 coupled to or in communication with one another. In other embodiments, one or more of the network hypervisors 124 may include additional, different, or fewer components, additional, different, or fewer modules 204, and/or may be arranged or constructed differently.

The communication module 208 of each network hypervisor 124 is configured to facilitate or enable communication between the respective associated computing node 120 and the other computing nodes 120 (and, more particularly, between the respective associated network hypervisor 124 and the other network hypervisors 124) via the communication network 116. For example, the communication module 208 of the network hypervisor 162 is configured to facilitate or enable communication between the client device 150, the provider computing device 154, and the networking device 158 (and, more particularly, between the network hypervisor 162 and the other network hypervisors 166, 170). To this end, the communication module 208 may receive signals, datagrams, data, packets, or information from the other computing nodes 120 (and the associated network hypervisors 124), transmit or send signals, data, packets, or information to the other computing nodes 120 (and the associated network hypervisors 124), when necessary or appropriate, de-packetize or packetize data packets, and otherwise synchronize data or information among or between the computing nodes 120 (and the associated network hypervisors 124). The communication module 208 of each network hypervisor 124 may, in other embodiments, perform additional, other, or fewer tasks as needed. The communication module 208 is configured to facilitate the communications using the existing communications protocols (e.g., Internet Protocol (IP) or Hypertext Transfer Protocol (HTTP)) of the respective associated computing node 120. For example, the communication module 208 of the network hypervisor 162 is configured to facilitate the communications using the existing communications protocols of the client device 150. For example, the communication module 208 establishes TCP/IP Layer 3 communications. In other embodiments, each communication module 208 may facilitate the communication using any other suitable communications protocols.

The service registry module 212 of each network hypervisor 124 is configured to identify or register new computing nodes 120 in the communication network 116 and new services (new instances of a same service or a new service) launched or executed on the respective associated computing node 120 or other computing nodes 120. Accordingly, the service registry module 212 generally provides each computing node 120 with the ability to locate one or more target computing nodes 120 (e.g., one or more target client devices 150, provider computing devices 154, and/or networking devices 158) and/or services offered or hosted by the one or more target computing nodes 120 on or in the communication network 116. In other embodiments, the service registry modules 212 may perform additional, other, or fewer tasks as needed.

When the service registry module 212 identifies new services launched or executed on the respective associated computing node 120, the service registry module 212 may alert or otherwise notify the other computing nodes 120 (and the network hypervisors 124 associated therewith) of the identification of these new services. The alert or notification system may be a broadcasting system (e.g., the service registry module 212 broadcasts the identification of the new services to all of the other computing nodes 120 using or via the communication module 208), a subscribe-notification system (e.g., the service registry module 212 notifies any other computing nodes 120 using or via the communication module 208 that have subscribed to the system of the identification of the new services), query-response, or some other notification system. When the service registry module 212 is alerted or notified that new services have been launched or executed on another computing node 120, the service registry module 212 registers the new services launched or executed on the other computing node 120.

The network discovery module 216 of each network hypervisor 124 is configured to detect, discover, or otherwise identify the network topology for the communication network 116. Each network discovery module 216 may thus, for example, identify the placement or arrangement of the components (e.g., the computing nodes 120) in the communication network 116, details about the connections between the computing nodes 120 in the communication network 116, data flow between the computing nodes 120 in the communication network 116, and resource allocation or availability at or for the computing nodes 120 in the communication network 116. In other embodiments, the network discovery module 216 may perform additional, other, or fewer tasks as needed. As will be described below, the network topology for the network 116 may be a factor when the virtual computing platform 108 is determining whether one or more of the computing nodes 120 is capable of providing, executing, or computing the services.

The code mobility module 220 of each network hypervisor 124 is configured to support, enable, or facilitate migration of active services between the respective associated computing node 120 (and the associated network hypervisor 124) and other computing nodes 120 (and the associated network hypervisors 124). In response to instructions or directions from the respective associated network hypervisor 124 (e.g., when the network hypervisor 124 determines that another node 120 has more available resources), the code mobility module 220 may, for example, suspend execution or computation of a service and transmit or send the partially executed service to the network hypervisor 124 associated with another node 120 (i.e., the destination node), which may resume and complete execution of the service (i.e., this is known as strong mobility), or may transfer the underlying code to the network hypervisor 124 associated with another node 120 via the network 116, which in turn, uses the code as a new service (i.e., this is known as weak mobility). In other embodiments, each code mobility module 220 may operate in a different manner and yet still perform the intended functionality of supporting or facilitating the migration of services between the nodes 120.

The monitoring module 224 of each network hypervisor 124 is configured to monitor or determine resource usage and available resources at the respective associated computing node 120 and/or other computing nodes 120. In the disclosed embodiments, each monitoring module 224 includes a collection module 250, an aggregation module 254, and a processing module 258. In other embodiments, the monitoring modules 224 may include additional, different, or fewer modules. For example, the collection module 250, the aggregation module 254, and/or the processing module 258 may be separate from the monitoring module 224 or may be merged into one module (e.g., the monitoring module 224).

The collection module 250 of each monitoring module 224 is configured to collect data or information indicative of resource usage at or for the respective associated computing node 120. The collection module 250 is configured to collect data indicative of, for example, CPU usage, memory usage, input/output usage, processing usage, and network bandwidth usage. Other data may be collected as well, such as CPU bandwidth or availability. The collection module 250 of each monitoring module 224 may also be configured to obtain data or information indicative of resource usage and/or availability at or for other computing nodes 120 initially collected by other collection modules 250 and transmitted or sent to the collection module 250 via the communication network 116.

The aggregation module 254 of each monitoring module 224 is configured to aggregate the data or information indicative of the resource usage at or for each of the computing nodes 120 (including the respective associated computing node 120). The aggregation module 254 may, for example, aggregate the data or information using a cluster-based approach, by which the computing nodes 120 may be divided or organized into a plurality of clusters and the data or information aggregated for each of the clusters. In the embodiments in which the computing nodes 120 include the client device 150, the provider computing device 154, and the networking device 158, the computing nodes 120 may, for example, be divided into any number of clusters, such as, for example, two clusters, one cluster for the client device 150 and the networking device 158 (i.e., one cluster for the "upstream" devices) and one cluster for the provider computing device 154 (i.e., one cluster for the "downstream" devices). The processing module 258 is configured to process (e.g., perform data analysis on) on the aggregated data or information. The processed data may, in turn, be output, in or to, for example, a resource table, and used when the virtual computing platform 108 is facilitating deployment of the one or more services to or among one or more of the computing nodes 120. Each node includes an aggregation module 254. In other embodiments, only one or fewer than all nodes include the aggregation module 254.

The cyber security module 228 of each network hypervisor 124 is configured to protect or secure the associated network hypervisor 124, and, more generally, the associated computing node 120 from or against attacks or unauthorized access. In the disclosed embodiments, the cyber security module 228 protects or secures each of the network hypervisors 124 by controlling access to the network hypervisors 124 and detecting potential intrusions (e.g., network and/or host intrusions). In other embodiments, the cyber security module 228 may protect the associated network hypervisor 124 in additional, different, or fewer ways.

The cyber security module 228 may protect or secure each of the network hypervisors 124 by controlling (e.g., limiting or restricting) access to the associated networking hypervisor 124 by other computing nodes 120, particularly other network hypervisors 124. The cyber security module 228 may, for example, store or maintain a list or database of the network hypervisors 124 with authorization or permission to access the respective network hypervisor 124 associated with the cyber security module 228. In one embodiment, the cyber security module 228 maintains the authorization or permission data in a resource table that keeps and lists this information. Based on this list or database, the cyber security module 228 may permit, restrict, or deny access to the associated networking hypervisor 124 by the other hypervisors 124. The exchange or storage of information may be encrypted or otherwise keyed for specific nodes or hypervisors 124. The authorization or permission may be set by and received or obtained from the service consumer 104, the service provider 112, or a combination thereof.

The cyber security module 228 may, alternatively or additionally, detect potential intrusions from the host and/or the communication network 116. The cyber security module 228 may monitor and analyze the dynamic behaviors of or at the associated computing node 120. For example, the cyber security module 228 may monitor which process(es) access(es) which resources of the computing node 120, information stored on or at the computing node 120, and the state of the computing node 120 in general. In turn, the cyber security module 228 may identify uncharacteristic or unusual behaviors (e.g., behaviors that do not correspond with standard behavioral patterns of or for the computing node 120) that may indicate that the security of the associated computing node 120 has been compromised. The cyber security module 228 may also monitor incoming data or information (e.g., incoming data packets) and identify suspicious patterns, known as signatures or rules, which may indicate that the security of the network 116 has been compromised. When the cyber security module 228 detects potential intrusions from the host and/or the communication network 116, the module 228 may refuse the communication, restrict access to or shut down the computing node 120 (or a portion thereof), or take other appropriate action to protect the security of the associated network hypervisor 124.

The service deployment module 232 of each network hypervisor 124 is generally configured to determine how to deploy (e.g., assign execution or computation of) the services during fulfillment of the service request for the service consumer 104. The service deployment module 232 may deploy the services to any one or more of the computing nodes 120, such as any one of the one or more client devices 150, the one or more provider computation devices 154, the one or more networking devices 158, or combinations thereof, for performance, computation, or execution at those nodes 120. In the disclosed embodiments, the service deployment module 232 may deploy the services to the client device 150, the provider computation device 154, the networking device 158, or combinations thereof.

The service consumer 104 may submit a service request for one or more services using or via the computing node 120, such as the client device 150, associated with the service consumer 104. The network hypervisor 162, which, as noted above, is associated with the client device 150, receives (e.g., intercepts) this request for services. Based on this request for services, the network hypervisor 162, using or via the service deployment module 232, is configured to facilitate deployment of the services to or among any of the computing nodes 120 by determining how to deploy (e.g., assign execution or computation of) the services to or among the computing nodes 120 during fulfillment of the service request. In other embodiments, such as, for example, when the request is submitted via another one of the computing nodes 120, any of the other network hypervisors (e.g., the network hypervisors 166 and/or 170) may receive (e.g., intercept) this request for services and facilitate deployment of the services in a similar manner as described below.

The network hypervisor 162 is configured to identify the one or more provider computing devices 154 (i.e., the one or more service providers, which are each associated with a respective one of the computing devices 154) in the communication network 116. In the embodiments in which the computing nodes 120 include only one provider computing device 154, the network hypervisor 162 only identifies one provider computing device 154 (i.e., one service provider). In the embodiments in which the computing nodes 120 include more than two provider computing devices 154, the network hypervisor 162 identifies the two or more provider computing devices 154.

At the same time, or at a different time (e.g., when the network hypervisor 162 determines that none of the one or more computing devices 154 is available to provide the one or more requested services), the network hypervisor 162 is configured to identify the one or more client devices 150 (i.e., the one or more service consumers, which are each associated with a respective one of the client devices 150) in the communication network 116. The network hypervisor 162 may identify one client device 150, two client devices 150, or more than two client devices 150. Likewise, at the same time (as the identification of the one or more computing devices 154 and/or the one or more client devices 150), or at a different time (than the identification of the one or more computing devices 154 and/or the one or more client devices 150), the network hypervisor 162 is configured to identify the one or more networking devices 158 in the communication network. The network hypervisor 162 may identify one networking device 158, two networking devices 158, or more than two networking devices 158. One or more types of nodes in the communication network 116 may not be identified.

The network hypervisor 162 is configured to determine or analyze whether the one or more provider computing devices 154, the one or more client devices 150, the one or more networking devices 158, or combinations thereof, are available to provide (e.g., execute, compute, or perform) or is capable of providing one or more of the requested services. In some embodiments, the network hypervisor 162 determines the availability of the devices 150, 154, 158 at the same time. In other embodiments, the network hypervisor 162 is configured to first determine whether the one or more provider computing devices 154 are available to provide one or more of the requested services, and may determine whether the one or more client devices 150 and/or the one or more networking devices 158 are available to provide the one or more requested services only when the one or more provider computing devices 154 are unavailable to perform those services (or, in the case of the one or more networking devices 158, only when the one or more provider computing devices 154 and the one or more client devices 150 are unavailable to perform those services).

The one or more computing devices 154, the one or more client devices 150, the one or more networking devices 158, or combinations thereof, may be considered to be "available" to provide or "capable of" providing the one or more requested services when, for example, the devices 150, 154, and/or 158 have sufficient resources available (e.g., have a computational capacity above or beyond a predetermined threshold (e.g., 20%), other devices 150, 154, and/or 158 are not available or accessible, or for some other reason.

The network hypervisor 162 is configured to assign or deploy the one or more requested services to any one or more of the computing nodes 120 (i.e., the one or more client devices 150, the one or more provider computing devices 154, and the one or more networking devices 158) based on the determination or analysis of the availability of the one or more provider computing devices 154, the one or more client devices 150, the one or more networking devices 158, or combinations thereof. The requested services may be deployed via the communication network 116 using, for example, the communication module 208 of the network hypervisor 162.

In some embodiments, when one or more of the provider devices 154 are available to provide one or more of the requested services, the network hypervisor 162 may deploy or assign execution, computation, or performance of those services to the one or more available provider devices 154, regardless of whether any other devices 150 and/or 158 are or are not available. In embodiments in which only one provider device 154 is available to provide one or more of the requested services, the network hypervisor 162 may deploy or assign execution, computation, or performance of those services to the available provider device 154. When, however, two or more of the devices 154 are available to provide one or more requested services, the hypervisor 162 may determine which of the devices 154 is to be assigned to provide or perform the one or more requested services. In some embodiments, the hypervisor 162 may determine that one device 154 is to be assigned to perform one requested service, another device 154 is to be assigned to perform another requested service, and yet another device 154 is to be assigned to perform yet another requested service. Any priority scheme may be used, such as, for example assigning or deploying one or more services to the device 154 with the greatest availability.

When, however, the one or more provider computing devices 154 are not available to provide one or more of the requested services (i.e., not available to provide each and every one of the requested services) or are less available (e.g., have less computational capacity) than the other devices 150 and/or 158, the network hypervisor 162 may deploy the one or more requested services to the available client devices 150 and/or networking devices 158. In the embodiments in which only one of the devices 150 and/or 158 is available to provide one or more of the requested services, the network hypervisor 162 may deploy those services to the available device 150, 158. When, however, two or more of the devices 150 and/or 158 are available to provide the one or more services, the hypervisor 162 may determine which of the devices 150 and/or 158 is to be assigned to provide the one or more requested services. Any priority scheme may be used. The devices 150 may generally be assigned a higher, less, or equal priority as the devices 158. In some embodiments, the hypervisor 162 may assign one or more of the requested services to the client device 150 and assign one or more of the other requested services to the networking device 158. As another example, the network hypervisor 162 may deploy two services to the client device 150 and two services to the networking device 158 (but not deploy any services to the provider computing device 154). The network hypervisor 162 may deploy the services to the one or more computing nodes 120 via the communication network 116 using, for example, the communication module 208.

The determination of which of the one or more devices 154 and/or which of the devices 150, 158 is/are available and/or are to be assigned to perform one or more requested services may be based on information or data collected, obtained, or maintained by the hypervisor modules 204, such as the communication module 208, the service registry module 212, the network module 216, the monitoring module 224, or combinations thereof, in the communication network 116. The data or information may be communication data, resource data (e.g., resource usage, resource/load availability), network topology data, other data, or combinations thereof. In other words, the determination of whether one or more computing nodes 120 are available and how to deploy the services to any one or more of the computing nodes 120 may be based on the communication profile, resource usage, resource availability (e.g., computational power availability, memory availability, input/output availability), network topology, other information or data, or combinations thereof, of the computing nodes 120 in the communication network 116. In one embodiment, the network hypervisor 162 may perform or make this determination based on a cost analysis using this information or data. As such, the cost analysis may consider or weigh the information collected, gathered, and/or maintained by the hypervisor modules 204, such as communications data, resource data (e.g., computational power availability/usage, input/output availability/usage, memory availability/usage, etc.), network topology, other information, or combinations thereof.

Additionally or alternatively, any priority scheme may be used. The priority scheme may assign a higher, less, or equal priority to the devices 150 (as compared to the devices 154 and/or the devices 158). For example, the devices 158 may be assigned a higher priority than the devices 150. In some embodiments, the cost analysis may consider or weigh this priority scheme when determining which of the one or more devices 154 and/or which of the devices 150, 158 is/are available and/or are to be assigned to perform one or more requested services.

One or more computing nodes 120 may receive the deployment or assignment of the one or more services via the communication network 116 using, for example, the communication module 208 of each respective node 120. In turn, the one or more computing nodes 120 may perform, provide, execute, or compute the deployed services. Once the services have been performed, the one or more computing nodes 120 may, using the communication module 208 of each respective node 120, provide the performed service to the network hypervisor 162 via the communication network 116. The virtual platform 108 may subsequently provide the service to the service consumer 104 via the client device 150.

In some embodiments, the network hypervisor 162 (or any other network hypervisor) is configured to dynamically deploy one or more of the services. In other words, the network hypervisor 162 may, even after the one or more services have been deployed, and, in some cases, even while the one or more services are being performed, determine that one or more previously deployed services should be re-deployed (i.e., the deployment should be changed or adjusted). The network hypervisor 162 may determine that the one or more previously deployed services should be re-deployed in a manner similar to how the network hypervisor 162 deployed the services in the first place. Re-deployment allows the network hypervisor 162 to shift performance of the one or more services from one or more computing nodes 120 to one or more other computing nodes. This may, for example, be necessitated because of a resource shortage (e.g., a lack of computational power availability, memory availability, or input/output availability), communications issues, changes in network topology, or for other reasons, at or with one or more of the computing nodes 120.

When the network hypervisor 162 determines that one or more services are to be re-deployed, the one or more previously deployed services may be moved or migrated from the one or more previously assigned computing nodes 120, using the one or more code mobility modules 220, to the newly assigned computing nodes 120. The movement may, as noted above, be accomplished by suspending execution of the one or more services and transmitting the one or more partially executed services to the one or more newly assigned computing nodes 120, by transferring the underlying code of the one or more services to the one or more newly assigned computing nodes 120, or a combination thereof.

The one or more services may be re-deployed any number of times. The network hypervisor 162 or the network hypervisor (e.g., the network hypervisor 166, 170) hosted on the node which is performing the service may determine whether one or more previously deployed services should be re-deployed any number of times. This re-deployment determination may be performed automatically, such as periodically and/or based on information or data collected by the hypervisor modules 204, and/or in response to a request by the service consumer 104 and/or the service provider 112. For example, the re-deployment determination may be automatically performed based on data indicative of a resource shortage, communications issues, a change in network topology, or other change in the state of the virtual platform 108.

By facilitating the deployment of one or more services in the manner described herein, the present embodiments utilize or leverage computational availability within existing upstream client computing devices and network devices during fulfillment or satisfaction of a service request and dynamically deploy services across all computing devices in the communication network. In turn, the present embodiments described herein may provide greater load balancing (e.g., the service providers will not be overloaded with computation requests), higher performance (e.g., higher performance services), higher scalability (any existing hardware may host the execution of services on demand), and higher service availability.

Figure 4:
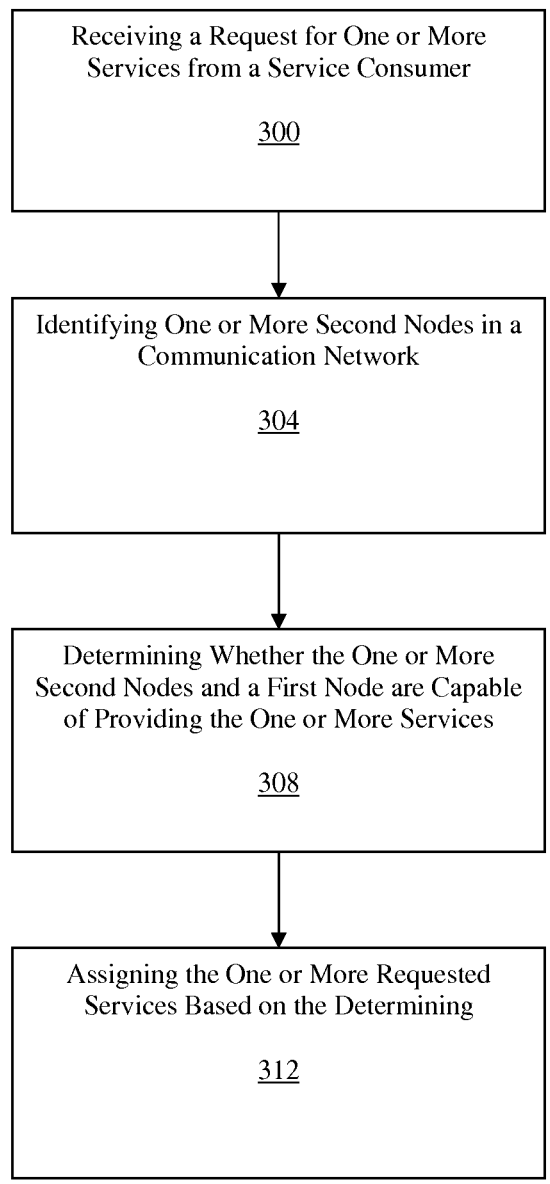
FIG. 4 is a flow chart diagram of one embodiment of a method for facilitating deployment of services in a communication network during fulfillment of a service request.

FIG. 4 shows a flow chart depicting a method for facilitating deployment of one or more services to a plurality of nodes in a communication network during fulfillment of a service request for a service consumer (e.g., the service consumer 104). The operation may be implemented using the system 100 described above. In other embodiments, a different system may be used. The method is implemented in the order shown, but may be implemented in or according to any number of different orders. Additional, different, or fewer acts may be provided. For example, any number of additional service requests may be received from the service consumer or another service consumer. As another example, the acts of identifying, determining, and/or assigning may be performed any number of times, such as, for example, based on or in response to a change in the state of the virtual platform (e.g., the virtual platform 108).

The plurality of nodes may include one or more first nodes, one or more second nodes, one or more third nodes, or combinations thereof, in or connected to the communication network. No second nodes may be provided. The one or more first nodes are associated with the service consumer (e.g., the service consumer 104) and may be or include one or more client devices (e.g., one or more client devices 150). The one or more second nodes are associated with one or more service providers (e.g., the service provider 112) and may be or include one or more provider computing devices (e.g., one or more computing devices 154). The one or more third nodes are or include one or more networking devices (e.g., one or more networking devices 158). The usage of "first," "second" and "third," as used herein in connection with the nodes, is merely for reference and is not intended to be limiting. For example, the one or more first nodes may be or include one or more networking devices, while the one or more third nodes may be or include one or more client devices associated with the service consumer.

The operation or method includes receiving a request for the one or more services from the service consumer (act 300). The request may be received at the first node of the plurality of nodes or may be received at one of the other nodes (e.g., the second or third nodes) of the plurality of nodes from or via the first node of the plurality of nodes. More specifically, the request may be received at a distributed software layer or network hypervisor (e.g., the network hypervisor 124) associated with (e.g., built into) the first node or one of the other nodes. For example, the request may be received at a network hypervisor (e.g., the network hypervisor 162) associated with the first node. As another example, the request may be received at a network hypervisor (e.g., the network hypervisor 166 or 170) associated with the second or third node.

The operation or method includes identifying one or more second nodes of the plurality of nodes in the communication network (act 304). The identifying is performed by the network hypervisor that receives the request for the one or more services. The operation or method may, in some embodiments, also include identifying one or more first or third nodes in the communication network. The identification of the one or more third nodes may occur at the same time as the identification of the one or more second nodes or may occur at a different (e.g., later) time.

The operation or method includes determining whether the one or more second nodes and the first node are capable of providing the one or more requested services (act 308). The determining may include determining whether the one or more second nodes and the first node are capable of providing the requested services based on a cost analysis performed by the network hypervisor. The cost analysis may be based on, for example, resource availability of the first node and the one or more second nodes. In the embodiments in which one or more third nodes are identified, the operation or method may further include determining whether the one or more third nodes are capable of providing the requested services. Such a determination may be made at the same time as the determination made with respect to the second nodes and the first node or may be made at a different (e.g., later) time.

The operation or method further includes assigning or deploying, based on the determining, the one or more requested services to the first node, one or more of the second nodes, or a combination thereof (act 312). The operation or method may, in some embodiments (e.g., when the one or more third nodes are available), include assigning or deploying the one or more requested services to the first node, one or more of the second nodes, one or more of the third nodes, or a combination thereof. Once assigned or deployed to the respective node(s), the node is charged with computing, executing, performing, or otherwise providing the one or more requested services.

The acts depicted in FIG. 4 and the devices shown in FIGS. 1-3 may use instructions stored in a memory. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method of facilitating deployment of one or more services to a plurality of nodes in a communication network during fulfillment of a service request for a service consumer, the method comprising:

receiving, via a network hypervisor, a request for the one or more services from the service consumer via a first node of the plurality of nodes, the first node being associated with the service consumer;

identifying, via the network hypervisor, one or more second nodes of the plurality of nodes in the communication network, each of the one or more second nodes being associated with one or more service providers;

determining, via the network hypervisor, whether the one or more second nodes and the first node are capable of providing the one or more requested services, the determining being based on a cost analysis performed by the network hypervisor, wherein the cost analysis is based, at least in part, on a level of resource availability of the first node and the one or more second nodes; and assigning, via the communication network, the one or more requested services to the first node, one or more of the second nodes, or a combination thereof, based on the determining.

2. The method of claim 1, wherein the network hypervisor is built into an operating system of the first node.

3. The method of claim 1, further comprising:
receiving the requested services from the first node, the one or more second nodes, or a combination thereof, via the communication network; and
providing the requested services to the service consumer via the first node.

4. The method of claim 3, wherein receiving the requested services comprises receiving the requested services from the one or more second nodes via a network hypervisor associated with the second node.

5. The method of claim 1, wherein the level of resource availability of the first node and the one or more second nodes is computational power availability, memory availability, input/output availability, or some combination thereof.

6. The method of claim 1, further comprising:
identifying, via the network hypervisor, one or more third nodes of the plurality of nodes in the communication network, each of the one or more third nodes being associated with one or more network devices
determining, via the network hypervisor, whether the one or more third nodes are capable of providing the requested services,
wherein assigning the requested services comprises assigning the provision of the requested services to the first node, one or more of the second nodes, one or more of the third nodes, or a combination thereof, based on the determining acts.

7. A system for facilitating deployment of services during fulfillment of a service request for a service consumer, the system comprising:
a first computer and a second computer in communication with each other via a communication network, the first computer being associated with the service consumer and the second computer being associated with a service provider; and
a memory storing instructions executable by the first computer, the instructions comprising instructions for:
receiving a request from the service consumer for the services;
determining, based on the service request, whether the second computer is available to provide the services based on a cost analysis, performed by a network hypervisor, wherein the cost analysis is based, at least in part, on a level of node availability of the second computer, and, when the second computer is available to provide one or more of the services, deploying the one or more services to the second computer; and
determining, when the second computer is not available to provide one or more of the services, whether the first computer is available to provide the one or more services based on a cost analysis, performed by the network hypervisor, wherein the cost analysis is based, at least in part, on the level of node availability of the first computer, and, when the first computer is available to provide the one or more services, deploying the one or more services to the first computer.

8. The system of claim 7, wherein the instructions further comprise instructions for:
receiving the services from the first computer, the second computer, or a combination thereof; and
providing the received services to the service consumer via the first computer.

9. The system of claim 7, wherein the first computer comprises a computing device associated with the service consumer.

10. The system of claim 7, wherein the instructions are stored on the network hypervisor built into the first computer.

11. The system of claim 10, wherein the network hypervisor is built into a top of an operating system of the first computer.

12. The system of claim 7, wherein the second computer comprises one or more computing devices associated with the service provider.

13. The system of claim 7, wherein the system further comprises a network device in communication with the first and second computers via the communication network, wherein the instructions further comprise instructions for:
determining, when the second computer is not available to provide one or more of the services, whether the network device is available to provide the one or more services; and
when the network device is available to provide the one or more services, deploying the one or more services to the network device.

14. The system of claim 7, wherein the node availability is based on a communication load profile, resource availability, and network topology.

15. A non-transitory computer-readable storage medium having stored therein data representing instructions executable by a programmed processor and a network hypervisor for facilitating deployment of one or more services to a plurality of devices in a communication network during fulfillment of a service request for a service consumer, the storage medium comprising instructions for:
receiving a request for the one or more services from a client device associated with the service consumer;
identifying one or more provider computing devices and one or more networking devices in the communication network, each of the one or more provider computing devices being associated with a service provider;
determining whether the client device, the one or more provider computing devices, and the one or more networking devices are capable of providing the one or more requested services based on a cost analysis, performed by the network hypervisor, wherein the cost analysis is based, at least in part, on a level of resource availability;
deploying, based on the determining, the one or more services to the client device, one or more of the provider computing devices, one or more of the networking devices, or combinations thereof, via the communication network; and
receiving the one or more services from the client device, one or more of the provider computing devices, one or more of the networking devices, or combinations thereof, via the communication network.

16. The computer-readable storage medium of claim 15, wherein the level of resource availability is computational power availability, memory availability, input/output availability, or some combination thereof.

17. The computer-readable storage medium of claim 15, further comprising, following the deploying, re-deploying the one or more requested services to the client device, one or more of the provider computing devices, one or more of the networking devices, or combinations thereof, via the communication network.

18. The computer-readable storage medium of claim 17, wherein re-deploying the one or more requested services comprises re-deploying the one or more requested services to the client device, one or more of the provider computing devices, one or more of the networking devices, or combinations thereof, via the communication network based on the cost analysis.

* * * * *